United States Patent [19]

Sugimoto et al.

[11] Patent Number: 5,322,864
[45] Date of Patent: Jun. 21, 1994

[54] EPOXY RESIN COMPOSITION AND CURED PRODUCT THEREOF

[75] Inventors: Toshio Sugimoto; Sadahiko Kawaguchi; Akira Esaki, all of Ibaraki, Japan

[73] Assignee: Mitsubishi Petrochemical Co., Ltd., Tokyo, Japan

[21] Appl. No.: 12,466

[22] Filed: Feb. 2, 1993

[30] Foreign Application Priority Data

Feb. 6, 1992 [JP] Japan .................................. 4-54101

[51] Int. Cl.$^5$ .......................... C08K 3/08; C08L 63/02
[52] U.S. Cl. .................................. 523/457; 428/404; 523/458; 524/440; 524/441
[58] Field of Search ............... 523/457, 458; 524/440, 524/441; 428/404

[56] References Cited

U.S. PATENT DOCUMENTS 4,732,962 3/1988 Atkins et al. ........................ 523/443

OTHER PUBLICATIONS

Lee and Neville, Handbook of Epoxy Resins (1967) pp. 10–17.

Primary Examiner—Melvyn I. Marquis
Assistant Examiner—David Aylward
Attorney, Agent, or Firm—Oblon, Spivak, McClelland, Maier & Neustadt

[57] ABSTRACT

An epoxy resin composition comprising (a) a low-viscosity epoxy resin having a viscosity of not more than 100 poise at 25° C. which contains a tri- or tetrafunctional liquid aromatic epoxy resin, (b) a liquid curing agent selected from the group consisting of an imidazole compound, the combination of a liquid alicyclic acid anhydride and an imidazole compound, the combination of a liquid alicyclic amine and an imidazole compound, (c) a metal powder having an average particle size of not more than 125 μm or an inorganic powder consisted of 50 parts or more by weight of a metal powder having an average particle size of not more than 125 μm and less than 50 parts by weight of an inorganic filler other than a metal powder, whose average particle size is smaller than that of the metal powder, based on the total amount of the metal powder and the inorganic filler. The composition has satisfactory fluidity and provides a cured product having high strength, a small thermal expansion coefficient, excellent heat-resistance and satisfactory surface characteristics. The composition is useful for the production of a resin mold, etc.

7 Claims, No Drawings

EPOXY RESIN COMPOSITION AND CURED PRODUCT THEREOF

FIELD OF THE INVENTION

This invention relates to an epoxy resin composition containing large quantities of a metal powder and an inorganic filler other than a metal powder and to a cured product thereof. More particularly, it relates to an epoxy resin composition which has satisfactory fluidity and a small linear expansion coefficient, provides a cured article having high strength, satisfactory dimensional stability, heat-resistance and satisfactory surface characteristics, and is therefore useful as a molding material for resin molds, jigs, and other various molded articles.

BACKGROUND OF THE INVENTION

Epoxy resin compositions containing a metal powder, such as aluminum powder, is known. For example, JP-B-50-38606 (the term "JP-B" as used herein means an "examined published Japanese patent application") discloses a resin molding material comprising 100 parts by weight of an epoxy resin, 40 to 60 parts by weight of aluminum powder of 200 to 500 mesh, and 10 to 20 parts by weight of a curing agent, which is molded to provide a resin mold for casting. However, the allowable highest compounding ratio of aluminum powder being 60 parts per 100 parts by weight of an epoxy resin, the resin material considerably shrinks on curing, failing to reproduce a mold faithful to the original. Besides, having a low thermal conductivity, the resin material is liable to undergo distortion on heating. To avoid this, curing must be effected with a slow rise in temperature, achieving poor workability.

JP-A-60-137623 (the term "JP-A" as used herein means an "unexamined published Japanese patent application") discloses a method for producing a resin mold for injection molding from an epoxy resin compounded with a relatively large quantity of a metal powder, e.g., aluminum powder or iron powder, as a filler so as to minimize shrinkage on curing and to improve thermal conduction. However, the epoxy resin composition used here comprises a bisphenol A type epoxy resin, as a result, has a high viscosity, and the metal powder to be used as a filler has a relatively large size. Use of large filler particles not only results in production of a resin mold with a poor appearance but also causes separation of the filler due to non-uniform dispersion of the filler in the resin matrix.

Further, JP-A-2-53850 describes a resin material comprising a low-viscosity epoxy resin having a viscosity of not more than 50 poise which contains an alicyclic epoxy resin and not less than 100 parts by weight, per 100 parts by weight of the total weight of the epoxy resin and a curing agent, of a metal powder containing at least 50% by weight of a fine powder having a particle size of not more than 44 μm, the resin material providing a cured product with low shrinkage on curing and high thermal conductivity. The cured product, however, does not satisfy impact resistance.

A resin mold has an advantage of production ease and low cost over a metal mold but, on the other hand, is apt to suffer from cracks during cutting or on repeated use. Accordingly, it has been demanded to develop a resin mold with high strength and small expansion coefficient which is not broken on repeated use. Under the present situation, a resin material providing a resin mold which meets these requirements has not yet been found.

SUMMARY OF THE INVENTION

An object of the present invention is to provide an epoxy resin composition which exhibits satisfactory fluidity and has a small coefficient of thermal expansion and provides a cured product excellent in surface characteristics and strength and is therefore advantageously useful for production of a resin mold or a casting mold.

Another object of the present invention is to provide a cured product obtained from the above-mentioned epoxy resin composition.

The present invention relates to an epoxy resin composition comprising (a) a low-viscosity epoxy resin having a viscosity of not more than 100 poise at 25° C. which contains a tri- or tetrafunctional liquid aromatic epoxy resin, (b) a liquid curing agent selected from the group consisting of an imidazole compound, the combination of a liquid alicyclic acid anhydride and an imidazole compound, and the combination of a liquid alicyclic amine and an imidazole compound, (c) a metal powder having an average particle size of not more than 125 μm or an inorganic powder consisted of (1) not less than 50 % by weight of a metal powder having an average particle size of not more than 125 μm and (2) less than 50 % by weight of an inorganic filler other than a metal powder, whose average particle size is smaller than that of (1) the metal powder, based on the total amount of (1) the metal powder and (2) the inorganic filler.

The total amount of component (c) is not less than 200 parts by weight per 100 parts by weight of the total amount of components (a) and (b).

The present invention also relates to a cured product of the above-mentioned epoxy resin composition.

DETAILED DESCRIPTION OF THE INVENTION

Component (a), a low-viscosity epoxy resin, contains a tri- or tetrafunctional liquid aromatic epoxy resin and has a viscosity of not more than 100 poise at 25° C. Use of a tri- or tetrafunctional epoxy resin provides a cured product with markedly increased strength than in using a bifunctional epoxy resin.

Examples of suitable tri- or tetrafunctional liquid aromatic epoxy resins include triglycidylaminophenol or triglycidylaminocresol as a trifunctional epoxy resin; and tetraglycidylxylenediamine or tetraglycidylaminodiphenylmethane as a tetrafunctional epoxy resin. These tri- or tetrafunctional liquid aromatic epoxy resins may be used either individually or in combination of two or more thereof. Component (a) may comprise such a tri- or tetrafunctional liquid aromatic epoxy resin(s) alone or, if desired, in combination with bifunctional liquid epoxy resins, as far as component (a) as a whole should have a viscosity of not more than 100 poise at 25° C. If component (a) has a viscosity higher than 100 poise, the resulting epoxy resin composition will have such an increased viscosity that flow into a mold i.e., workability, is reduced. The epoxy resins having aromatic rings are excellent in heat-resistance as compared with alicyclic epoxy resins.

Component (b) used in the present invention is liquid curing agent, which is liquid at room temperature (approximately from 20° to 25° C.), comprising an imidazole compound.

Examples of the liquid alicyclic acid anhydride include a mixture comprising isomers of methyltetrahydrophthalic anhydride, methylhexahydrophtoalic anhydride, and 3,6-endomethylenemethyltetrahydrophthalic anhydride.

The acid anhydride curing agent may be used in an amount to be used generally in the art, but is preferably used in an amount such that the ratio by equivalent of an acid anhydride group / an epoxy group is 6/10 to 12/10, particularly 8/10 to 1/1.

The liquid alicyclic acid anhydride of the present invention is used in combination with the imidazole compound described hereinafter. If the imidazole compound is dispensed with, curing does not proceed sufficiently, resulting in insufficient characteristics (e.g., mechanical strength).

Examples of the liquid alicyclic amine curing agent include menthanediamine, isophoronediamine and bis(4-amino-3-methylcyclohexyl)methane.
Isophoronediamine is particularly preferred, since the use of isophoronediamine provides a resin composition with low viscosity and a cured product having less bubbles generated therein and excellent heat-resistance.

The reason why the alicyclic amine curing agent is used as an amine type curing agent in the present invention is because the use provides a resin composition having low viscosity and a cured product having excellent heat-resistance and less shrinkage on curing.

The alicyclic amine type curing agent can be used in an amount to be used generally for an epoxy composition in the art, but is preferably used in an amount such that the ratio by equivalent of an active hydrogen / an epoxy group is from 5/10 to 20/10, particularly from 8/10 to 15/10.

The alicyclic amine curing agent of the present invention is used in combination with the imidazole compound described hereinafter. If the imidazole compound is dispensed with, curing does not proceed sufficiently under low temperature, resulting in insufficient characteristics (e.g., resistance property to heat and impact).

Generally used imidazole compounds can be used as the imidazole compound of the present invention. Examples of the imidazole compound include 2-methylimidazole, 2-ethylimidazole, 2-phenylimidazole, 2-undecylimidazole, 2-hepthadecylimidazole, 2-isopropylimidazole, 2,4-dimethylimidazole, 2-ethyl-4-methylimidazole, 2-ethyl-5-methylimidazole, 1-benzyle-2-methylimidazole, 1-isobutyl-2-methylimidazole, 2-phenyl-4-methylimidazole, 2-methyimidazoleazine, 1-cyanoethyl-2-ethyl-4-methylimidazole and 1-cyanoethyl-2-ethyl-5-methylimidazole.

Examples of the liquid imidazole compound include 1-benzyl-2-methylimidazole, 1-isobutyl-2-methylimidazole, 1-cyanoethyl-2-ethyl-4-methylimidazole, 1-cyanoethyl-2-isopropylimidazole, 1-benzyl-2-ethylimidazole, 1-methyl-2-ethylimidazole, and 1-cyanoethyl-2-methylimidazole.

Among these, those being liquid at room temperature are particularly preferred. Among those being solid at room temperature, those being capable of dissolving in a liquid acid anhydride or liquid alicyclic amine are preferably used.

The liquid imidazole compound is used in the case where the imidazole compound is singly used.

These imidazole compounds may be used either singly or in combination of two or more thereof.

2-Ethyl-4-methylimidazole, which is semi-solid at room temperature, is mixed with the above-described various imidazole compounds being liquid at room temperature, easily to obtain a curing agent liquid at room temperature.

The addition of the imidazole type compound provides a cured product having large mechanical strength and less shrinkage on curing. Furthermore, those having a cyano group are particularly preferred, since they provide a cured product having remarkably large thermal conductivity. Examples thereof include 1-cyanoethyl-2-ethyl-4-methylimidazole, 1-cyanoethyl-2-isopropylimidazole and 1-cyanoethyl-2-methylimidazole.

The added amount of the imidazole compound is generally from about 0.5 to about 15 parts by weight, preferably from 2 to 12 parts by weight, per 100 parts by weight of component (a) (i.e., the epoxy resin). The added amount of the imidazole compound in the combined use with the alicyclic acid anhydride or the alicyclic amine is generally less than that in the single use of the imidazole compound and is preferably from 0.3 to 3 parts by weight per 100 parts by weight of component (a).

The single use of the liquid imidazole compound and the combined use of the liquid alicyclic amine and the imidazole compound are preferably applied, especially for large-sized molds, since they provide a cured product having less shrinkage on curing as compared with the combined use of the liquid alicyclic acid anhydride and the imidazole compound.

Resin molds are generally desired to have a glass transition temperature (Tg) of 160° C. or more with respect to heat-resistance.

Component (c), a metal powder, should have an average particle size of not more than 125 μm, and preferably not more than 80 μm, with the lower limit being preferably 5 μm. Examples of suitable metal powders include various metal powders such as aluminum powder, copper powder, iron powder, nickel powder and chromium powder, and alloy powders comprising two or more of these metals. Aluminum powder and aluminum alloy powder are preferably used, since they have excellent wetting property to epoxy resins and small specific gravity which is advantageous to lighten cured resin products.

If a composition comprising metal powder having a large particle size is applied for a resin mold, the cast article, prepared by using the resin mold, is inferior in surface characteristic, as well as the resin composition has poor storage stability and the cured resin has poor physical properties, since the filers (i.e., the metal powder and the inorganic filler) do not disperse in the resin composition uniformly.

The metal powder having broad distribution in particle size is preferred as compared that having the narrow distribution, since it is likely to decrease viscosity of the resin composition. Therefore, a mixture comprising a plural of metal powders having different average particle sizes is preferably used. The metal powder may be pre-treated with a surface treating agent (e.g., a silane type or titanium type coupling agent and a triazinethiol type compound.

The partial component of component (c), an inorganic filler other than a metal powder (hereinafter simply referred to as an inorganic filler) which is used in combination with the metal powder, includes a variety of materials, such as silica powder, alumina powder, aluminum hydroxide powder, calcium carbonate powder, silicon carbide powder, aluminum nitride powder, and boron nitride powder. The particle size of the inorganic filler should be smaller than that of the metal powder to be used in combination and is preferably not greater than ⅔ of that of the metal powder. The inorganic filler having a particle size of 10 μm or less is preferred. If the particle size of the inorganic filler exceeds 125 μm, the resulting cured product, e.g., a resin mold, has poor surface properties only to produce a cast article with poor appearance. Where an inorganic filler having a smaller particle size than that of the metal powder is used, the composition approaches so-called closest packing to have a reduced viscosity. If the particle size of the inorganic filler is the same as or greater than that of the metal powder, such a viscosity reducing effect of the composition cannot be obtained. As the particle size of the inorganic filler is further decreased, sedimentation or separation of the filler during storage of the composition can be prevented. Aluminum nitride powder is preferably used as the inorganic filler, since the resulting cured product having improved thermal conductivity is obtained.

The filler components (components (c)) must be present in an amount of not less than 200 parts by weight, preferably from 250 to 350 parts by weight, per 100 parts by weight of the total amount of the resinous components (components (a) and (b)). Otherwise, the resulting cured product has a large linear expansion coefficient so that it is apt to break when used repeatedly.

The inorganic filler should be present in an amount of less than 50% by weight, and preferably from 5 to 40% by weight, based on the total inorganic powder (the total amount of the metal powder and the inorganic filler). Too a high proportion of the inorganic filler in the total inorganic powder results in an increase in viscosity of the composition, making the composition less practical.

If desired, the epoxy resin composition may further contain various additives other than components (a) to (c), for example, curing accelerators, flame retardants, thixotropic agents, reactive diluents, leveling agents, lubricants, defoaming agents, dispersing agents, coupling agents, dyes, pigments, rust inhibitors, antioxidant and so forth. These additives being known per se, the detailed description therefor is omitted here.

The epoxy resin composition of the present invention can be prepared by mixing the essential components (a) to (c) and any additives as desired at a prescribed ratio, and kneading the mixture by means of, for example, a kneader, a roll, or a mixer. There are some cases in which only component (b) is mixed immediately before use of the composition, for preference.

Curing of the epoxy resin composition can be carried out by various means. The cured product according to the present invention has a small linear expansion coefficient, satisfactory dimensional stability, satisfactory surface characteristics, and high strength.

The epoxy resin composition according to the present invention is preferably cured by carrying out the first curing at a temperature of 80° C. or less (e.g., 40° to 60° C.) for 3 to 10 hours and subsequently the second curing at a temperature of 80° C. or more (e.g., 100 to 150° C.) for 5 to 10 hours.

Thus, the epoxy resin composition of the present invention can be used for the production of resin molds, jigs, and any other various molded articles.

The present invention is not illustrated in greater detail with reference to Examples, but it should be understood that the present invention is not deemed to be limited thereto.

EXAMPLE 1

| | |
|---|---|
| Triglycidylaminophenol | 40 g |
| Methyltetrahydrophthalic anhydride | 60 g |
| 2-Ethyl-4-methylimidazole | 1 g |
| Aluminum powder (average particle size: 70 μm) | 250 g |
| Silica powder (average particle size: 10 μm) | 30 g |

The above components were kneaded in a kneader, and the resulting composition was heated at 120° C. for 6 hours to cure. The fluidity of the composition, the flexural strength, linear expansion coefficient and Tg (glass transition temperature) of the cured product, and the surface condition of a cast article obtained by using the resulting cured product as a casting mold were evaluated as follows. The results obtained are shown in Table 1 below.

1) Fluidity:
Fluidity of the composition was evaluated according to the following standard:
Good . . . Satisfactory flow into a mold.
Medium . . . Slightly unsatisfactory flow into a mold.
Bad . . . Unsatisfactory flow into a mold.

2) Flexural Strength:
Measured according to ASTM D-790.

3) Linear Expansion Coefficient:
Measured according to JIS K-6911.

4) Surface Condition of Cast:
Evaluated with eyes according to the following standard:
Good . . . Smooth.
Medium . . . Fairly smooth.
Bad . . . Rough.

5) Glass Transition Temperature (Tg):
Measured using Thermomechanical Analyzer 943 Type manufactured by Du Pont Instruments.

6) thermal conductivity:
Measured using Thermal Constant Measurement Apparatus TC-3000 Type (Laser Flash Method) manufactured by Shinku Rico K.K.

EXAMPLE 2

| | |
|---|---|
| Triglycidylaminophenol | 33 g |
| Bisphenol A diglycidyl ether | 10 g |
| Endomethylenemethyltetrahydrophthalic anhydride | 61 g |
| 2-Ethyl-4-methylimidazole | 1 g |
| Aluminum powder (average particle size: 50 μm) | 220 g |
| Silica powder (average particle size: 5 μm) | 30 g |

The above components were mixed and cured in the same manner as in Example 1. The evaluation of the cured product was carried out in the same manner as in Example 1. The test results are shown in Table 1.

EXAMPLE 3

| | |
|---|---|
| Triglycidylaminocresol | 75 g |
| Isophoronediamine | 33 g |
| 2-Ethyl-4-methylimidazole | 2 g |
| Aluminum powder (average particle size: 40 μm) | 260 g |

The above components were kneaded in a kneader, and the resulting composition was heated at 50° C. for 5 hours and further at 120° C. for 5 hours to cure. The evaluation of the cured product was carried out in the same manner as in Example 1. The results obtained are shown in Table 1 below.

EXAMPLE 4

| | |
|---|---|
| Triglycidylaminocresol | 100 g |
| 2-Ethyl-4-methylimidazole | 6 g |
| Aluminum powder (average particle size: 30 μm) | 324 g |

The above components were kneaded in a kneader, and the resulting composition was casted and heated at 50° C. for 5 hours and further 150° C. for 5 hours to cure. The evaluation of the cured product was carried out in the same manner as in Example 1. Furthermore, the thermal conductivity of the cured product was evaluated. The results obtained except for the thermal conductivity are shown in Table 1 below.

EXAMPLE 5

| | |
|---|---|
| Triglycidylaminophenol | 100 g |
| 1-Cyanoethyl-2-ethyl-4-methylimidazole | 8 g |
| Aluminum powder (average particle size: 40 μm) | 324 g |

The above components were mixed, casted and cured in the same manner as in Example 4, and the resulting cured product was evaluated in the same manner as in Example 4. The results obtained except for the thermal conductivity are shown in Table 1 below.

The cured products of Examples 4 and 5 had the thermal conductivity of $8 \times 10^{-3}$ and $11 \times 10^{-3}$ cal/cm.S.°K, respectively.

COMPARATIVE EXAMPLE 1

An epoxy resin composition was prepared and cured in the same manner as in Example 1, except for replacing the aluminum powder having an average particle size of 70 μm with aluminum powder having an average particle size of 160 μm. The test results are shown in Table 1.

COMPARATIVE EXAMPLE 2

An epoxy resin composition was prepared and cured in the same manner as in Example 1, except for decreasing the amount of the aluminum powder having an average particle size of 70 μm to 100 g. The test results are shown in Table 1.

COMPARATIVE EXAMPLE 3

An epoxy resin composition was prepared and cured in the same manner as in Example 2, except for decreasing the amount of the aluminum powder having an average particle size of 50 μm to 30 g and increasing the amount of the silica powder having an average particle size of 5 μm to 220 g. The test results are shown in Table 1.

COMPARATIVE EXAMPLE 4

An epoxy resin composition was prepared and cured in the same manner as in Example 4, except that bisphenol F diglycidylether was used in place of triglycidylaminocresol and 2-ethyl-4-methylimidazole was not used. The resulting cured product was evaluated in the same manner as in Example 4. The test results are shown in Table 1.

COMPARATIVE EXAMPLE 5

| | |
|---|---|
| Triglycidylaminophenol | 80 g |
| Tetraethylenepentamine | 20 g |
| Aluminum powder (average particle size: 50 μm) | 220 g |
| Silica powder (average particle size: 5 μm) | 20 g |

The above components were mixed and cured in the same manner as in Example 1. The test results are shown in Table 1.

TABLE 1

| Example No. | Fluidity | Flexural Strength (kg/mm$^2$) | Linear Expansion Coefficient (cm/cm · °C.) | Surface Condition of Cast | Tg (°C.) |
|---|---|---|---|---|---|
| Example 1 | good | 15 | $3 \times 10^{-5}$ | good | 190 |
| Example 2 | good | 14 | $3 \times 10^{-5}$ | good | 195 |
| Example 3 | good | 15 | $3 \times 10^{-5}$ | good | 185 |
| Example 4 | good | 12 | $3 \times 10^{-5}$ | good | 180 |
| Example 5 | good | 13 | $3 \times 10^{-5}$ | good | 180 |
| Comparative Example 1 | good | 13 | $3 \times 10^{-5}$ | bad | 190 |
| Comparative Example 2 | good | 12 | $6 \times 10^{-5}$ | good | 180 |
| Comparative Example 3 | bad | 14 | $3 \times 10^{-5}$ | good | 190 |
| Comparative Example 4 | good | 8 | $3 \times 10^{-5}$ | good | 130 |
| Comparative Example 5 | good | 13 | $3 \times 10^{-5}$ | good | 125 |

As is apparent from the results in Table 1, the resin compositions according to the present invention have excellent flow characteristics and provide a cured product with a good balance of flexural strength, expansion coefficient, heat-resistance and surface characteristics.

EXAMPLE 6

| | |
|---|---|
| Triglycidyl 4-aminocresol | 100 g |
| 1-Cyanoethyl-2-ethyl-4-methylimidazole | 6 g |
| Aluminum powder (average particle size: 40 μm) | 270 g |
| Aluminum nitride powder (average particle size: 1 μm) | 54 g |

The above components were mixed, casted and cured in the same manner as in Example 4, and the resulting cured product was evaluated in the same manner as in Example 4. The cured product had tensile strength of 800 kg/cm$^2$, compression strength of 2,100 kg/cm$^2$, and thermal conductivity of $15 \times 10^{-3}$ cal/cm.S.°K. The tensile strength and compression strength were measured in accordance with JIS K-6911.

As described and demonstrated above, the present invention provides an epoxy resin composition having satisfactory fluidity and providing a cured product having high strength, a small thermal expansion coefficient, excellent heat-resistance and satisfactory surface characteristics.

While the invention has been described in detail and with reference to specific examples thereof, it will be apparent to one skilled in the art that various changes and modifications can be made therein without departing from the spirit and scope thereof.

We claim:

1. An epoxy resin composition consisting essentially of (a) a low-viscosity epoxy resin having a viscosity of not more than 100 poise at 25° C. which contains a tri- or tetrafunctional liquid aromatic epoxy resin, (b) a liquid curing agent selected from the group consisting of an imidazole compound and the combination of a liquid alicyclic amine and imidazole compound (c) a metal powder having an average particle size or not more than 125 $\mu$m or an inorganic powder consisted of not less than 50% by weight of a metal powder having an average particle size of not more than 125 $\mu$m and less than 50% by weight of an inorganic filler other than a metal powder, whose average particle size is smaller than that of the metal powder, based on the total amount of the metal powder and the inorganic filler.

2. The epoxy resin composition of claim 1, wherein the metal powder has an average particle size of 80 $\mu$m or less.

3. The epoxy resin composition of claim 1, wherein the ratio of the average particle size of the inorganic filler to the average particle size of the metal powder is 170 or less.

4. The epoxy resin composition of claim 1, wherein the tri- or tetrafunctional liquid aromatic epoxy resin is at least one epoxy resin selected from triglycidylaminophenol, triglycidylaminocresol, tetraglycidylxylenediamine, or tetraglycidylaminodipheynlmethane.

5. The epoxy resin composition of claim 1, wherein the liquid curing agent comprises an imidazole compound and at least one alicyclic diamine selected from the group consisting of menthanediamine, isophoronediamine and bis(4-amino-3-methylcylohexyl)methane.

6. The epoxy resin composition of claim 1, wherein the liquid imidazole compound is selected from the group consisting of 1-benzyl-2-methylimidazole, 1-isobutyl-2-methylimidazole, 1-cyanoethyl -2-ethyl-4-methylimidazole, 1-cyanoethyl-2-isopropylimidazole, 1-benzyl-2-ethylimidazole, 1-methyl-2-ethylimidazole, 1-cyanoethyl-2-methylimidazole and 2-ethyl-4-methylimidazole.

7. An epoxy resin cured product obtained by curing an epoxy resin composition wherein said epoxy resin composition consists essentially of (a) a low-viscosity epoxy resin having a viscosity of not more than 100 poise at 25° C. which contains a tri- or tetrafunctional liquid aromatic epoxy resin, (b) a liquid curing agent selected from the group consisting of an imidazole compound and the combination of a liquid alicyclic amine and an imidazole compound, (c) a metal powder having an average particle size of not more than 125 $\mu$m or an inorganic powder consisted of not less than 50% by weight of a metal powder having an average particle size of not more than 125 $\mu$m and less than 50% by weight of an inorganic filler other than a metal powder, whose average particle size is smaller than that of the metal powder, based on the total amount of the metal powder and the inorganic filler.

* * * * *